(12) United States Patent
Shingu et al.

(10) Patent No.: US 11,575,836 B2
(45) Date of Patent: Feb. 7, 2023

(54) IMAGING DEVICE AND CAMERA BODY

(71) Applicant: Panasonic Intellectual Property Management Co., Ltd., Osaka (JP)

(72) Inventors: Yasuhiro Shingu, Osaka (JP); Naotaka Kishida, Osaka (JP); Kyosuke Osuka, Osaka (JP); Takaaki Yamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 515 days.

(21) Appl. No.: 16/470,493

(22) PCT Filed: Nov. 15, 2018

(86) PCT No.: PCT/JP2018/042246
§ 371 (c)(1),
(2) Date: Jun. 17, 2019

(87) PCT Pub. No.: WO2020/100243
PCT Pub. Date: May 22, 2020

(65) Prior Publication Data
US 2021/0356842 A1   Nov. 18, 2021

(51) Int. Cl.
*H04N 5/232*   (2006.01)
*G03B 13/36*   (2021.01)
(Continued)

(52) U.S. Cl.
CPC ....... *H04N 5/232939* (2018.08); *G03B 13/36* (2013.01); *G03B 17/14* (2013.01); *H04N 5/2252* (2013.01); *H04N 5/374* (2013.01)

(58) Field of Classification Search
None
See application file for complete search history.

(56) References Cited

U.S. PATENT DOCUMENTS

2004/0184795 A1   9/2004   Okawara
2007/0071435 A1*  3/2007   Moriya ............ H04N 5/232127
                                                    396/131
(Continued)

FOREIGN PATENT DOCUMENTS

EP   1770421 A2   4/2007
JP   11-23943 A   1/1999
(Continued)

OTHER PUBLICATIONS

Extended European Search Report for corresponding Application No. 18882282.9, dated Feb. 10, 2020.
(Continued)

*Primary Examiner* — Quan Pham
(74) *Attorney, Agent, or Firm* — Renner, Otto, Boisselle & Sklar, LLP

(57) ABSTRACT

The imaging device includes a camera body and an interchangeable lens unit detachably attached to the camera body, the imaging device including, an optical system including a focus lens, an infinite rotation type focus ring, a lens drive part moving the focus lens forward and backward in an optical axis direction of the optical system, a setting part allowing a user to set a rotation range of the focus ring, a storage part assigning and storing respective different rotation amounts of the focus ring to multiple positions within a movement stroke of the focus lens in accordance with a rotation range set in the setting part, and a control part driving the lens drive part to move the focus lens depending on a rotation amount of the focus ring to a position corresponding to the rotation amount stored in the storage part.

6 Claims, 13 Drawing Sheets

(51) Int. Cl.
*G03B 17/14* (2021.01)
*H04N 5/225* (2006.01)
*H04N 5/374* (2011.01)

(56) References Cited

U.S. PATENT DOCUMENTS

| | | |
|---|---|---|
| 2009/0279192 A1 | 11/2009 | Harada |
| 2012/0328277 A1 | 12/2012 | Nakata et al. |
| 2013/0222926 A1 | 8/2013 | Kawada |
| 2016/0116824 A1* | 4/2016 | Okawa ................. G03B 3/10 396/133 |
| 2017/0343766 A1 | 11/2017 | Okawa |
| 2018/0143397 A1* | 5/2018 | Kato ................. G03B 3/10 |
| 2019/0020828 A1* | 1/2019 | Isono ............... H04N 5/232945 |
| 2019/0174053 A1* | 6/2019 | Okuyama .......... H04N 5/23296 |

FOREIGN PATENT DOCUMENTS

| | | | |
|---|---|---|---|
| JP | 2004-287038 A | 10/2004 | |
| JP | 2008-102207 A | 5/2008 | |

OTHER PUBLICATIONS

Office Action for Corresponding Chinese Application No. 201880005592.2 dated Oct. 15, 2021 and its English Translation.
International Preliminary Report on Patentability for Corresponding Application No. PCT/JP2018/042246 dated May 27, 2021, English Translation.
International Search Report and Written Opinion for corresponding Application No. PCT/JP2018/042246, dated Jan. 29, 2019.

\* cited by examiner

IMAGING DEVICE AND CAMERA BODY

TECHNICAL FIELD

The present disclosure relates to an imaging device including an infinite rotation type focus ring having no mechanical restriction on a rotation range, and a camera body included in the imaging device.

BACKGROUND ART

Conventionally known imaging devices of this type include an imaging device configured to move a focus lens in an optical axis direction of an optical system for focusing depending on a rotation speed of the focus ring. This imaging device can roughly be focused by rotating the focus ring at high speed and can finely be focused by rotating the focus ring at low speed, for example. However, the imaging device has a problem that the rotation position of the focus ring in focus differs between low-speed rotation and high-speed rotation.

In this regard, an imaging device configured to move a focus lens in an optical axis direction of an optical system depending on a rotation amount of the focus ring has been proposed (e.g., see Patent Documents 1 and 2). According to this imaging device, the rotation position of the focus ring in focus can be made coincident regardless of the rotation speed.

PRIOR ART DOCUMENTS

Patent Documents

Patent Document 1: Japanese Laid-Open Patent Publication No. 2004-287038
Patent Document 2: Japanese Laid-Open Patent Publication No. 2008-102207

SUMMARY OF THE INVENTION

Problem to be Solved by the Invention

However, to achieve fine focusing in the configuration in which a focus is adjusted depending on a rotation amount of a focus ring, a rotation range of the focus ring must be made larger. If the rotation range of the focus ring is made larger, a rotation amount of the focus ring required for roughly bringing into focus is increased. Therefore, it is necessary to rotate the focus ring in a large rotation amount each time for focusing, which deteriorates usability. Thus, the conventional imaging devices still have room for improvement in terms of further improving usability.

An object of the present disclosure is to solve the problems and to provide an imaging device and a camera body capable of further improving usability.

Means for Solving Problem

An imaging device according to the present disclosure is an imaging device including a camera body and an interchangeable lens unit detachably attached to the camera body, the imaging device comprising:
an optical system including a focus lens;
an infinite rotation type focus ring;
a lens drive part moving the focus lens forward and backward in an optical axis direction of the optical system;
a setting part allowing a user to set a rotation range of the focus ring;
a storage part assigning and storing respective different rotation amounts of the focus ring to multiple positions within a movement stroke of the focus lens in accordance with a rotation range set in the setting part; and
a control part driving the lens drive part to move the focus lens depending on a rotation amount of the focus ring to a position corresponding to the rotation amount stored in the storage part.

Effect of the Invention

According to the imaging device of the present disclosure, usability can further be improved.

MODES FOR CARRYING OUT THE INVENTION

Figure 1:
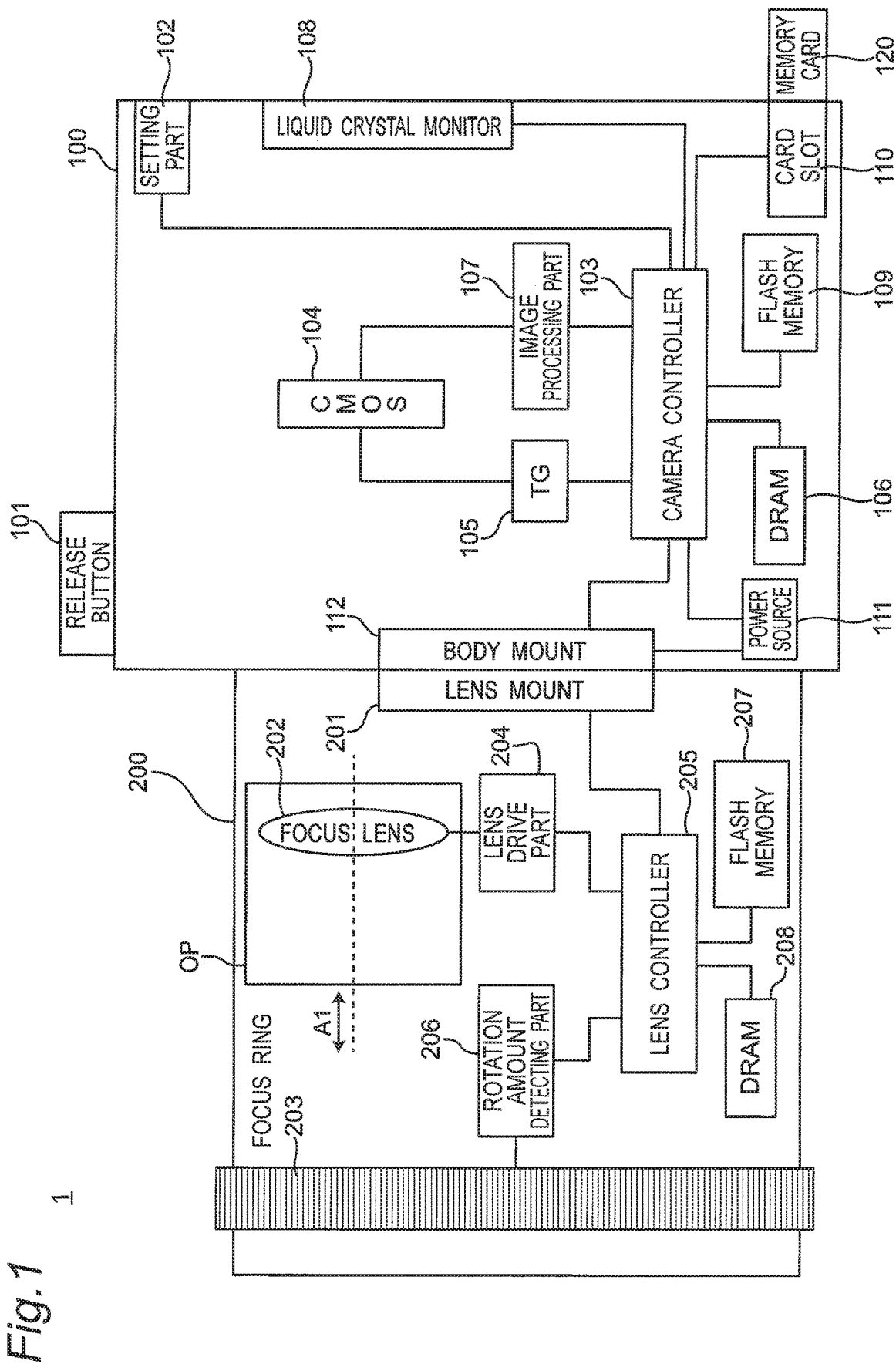
FIG. 1 is a block diagram showing a schematic configuration of an imaging device according to an embodiment.

A first aspect of the present disclosure provides an imaging device including a camera body and an interchangeable lens unit detachably attached to the camera body, the imaging device comprising:

an optical system including a focus lens;

an infinite rotation type focus ring;

a lens drive part moving the focus lens forward and backward in an optical axis direction of the optical system;

a setting part allowing a user to set a rotation range of the focus ring;

a storage part assigning and storing respective different rotation amounts of the focus ring to multiple positions within a movement stroke of the focus lens in accordance with a rotation range set in the setting part; and a control part driving the lens drive part to move the focus lens depending on a rotation amount of the focus ring to a position corresponding to the rotation amount stored in the storage part.

A second aspect of the present disclosure provides the imaging device according to the first aspect, wherein the setting part is configured to enable selection of one rotation range from a plurality of rotation ranges preset as rotation ranges of the focus ring assignable to multiple positions within the movement stroke.

A third aspect of the present disclosure provides the imaging device according to the second aspect, further comprising a display part displaying the plurality of preset rotation ranges.

A fourth aspect of the present disclosure provides the imaging device according to the first aspect, wherein the interchangeable lens unit includes a rotation amount storage part storing information of a maximum rotation amount and a minimum rotation amount of the focus ring assignable to multiple positions within the movement stroke, and wherein the setting part is configured to enable setting of the rotation range of the focus ring within a range from the maximum rotation amount to the minimum rotation amount stored in the rotation amount storage part of the interchangeable lens unit when the interchangeable lens unit is attached to the camera body.

A fifth aspect of the present disclosure provides the imaging device according to the fourth aspect, further comprising a display part displaying multiple rotation amounts within the range from the maximum rotation amount to the minimum rotation amount stored in the rotation amount storage part of the interchangeable lens unit attached to the camera body, wherein the setting part is configured to enable selection of any one of the multiple rotation amounts displayed on the display part as the rotation range of the focus ring.

A sixth aspect of the present disclosure provides the imaging device according to any one of the first to fifth aspects, wherein the setting part is configured to enable selection of either a first mode in which the focus lens is moved depending on a rotation range of the focus ring or a second mode in which the focus lens is moved depending on a rotation speed of the focus ring.

A seventh aspect of the present disclosure provides the imaging device according to any one of the first to sixth aspects, further comprising an excess rotation amount storage part storing an excess rotation amount of the focus ring rotated in one direction beyond a rotation range set in the setting part when the focus ring is rotated in one direction beyond the rotation range, wherein when the focus ring is rotated in one direction beyond the rotation range set in the setting part, the control part stops drive of the lens drive part until the focus ring is rotated in the opposite direction by the excess rotation amount stored in the excess rotation amount storage part.

An eighth aspect of the present disclosure provides the imaging device according to the seventh aspect, wherein the control part drives the lens drive part when the focus ring is rotated in one direction beyond the rotation range set in the setting part and is further rotated in one direction by a rotation amount obtained by subtracting the rotation range set in the setting part and the excess rotation amount from an integral multiple of 360 degrees.

A ninth aspect of the present disclosure provides the imaging device according to the seventh or eighth aspect, wherein the setting part is configured to enable selection of whether to control the drive of the lens drive part based on the excess rotation amount.

A tenth aspect of the present disclosure provides a camera body used in the imaging device according to any one of the first to ninth aspects, the camera body comprising: at least the setting part.

An embodiment will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The accompanying drawings and the following description are provided for sufficient understanding of this disclosure by those skilled in the art, and it is not intended to limit the subject matter described in claims thereto.

Embodiment

FIG. 1 is a block diagram showing a schematic configuration of an imaging device according to an embodiment. In the embodiment, an imaging device 1 is a lens-interchangeable digital camera.

As shown in FIG. 1, the imaging device 1 according to the embodiment includes a camera body 100 and an interchangeable lens unit 200 detachably attached to the camera body 100.

The camera body 100 includes a release button 101, a setting part 102, a camera controller 103 that is an example of a control part, and a CMOS image sensor 104 that is an example of an imaging element.

The release button 101 accepts an operation of an imaging instruction or an autofocus instruction from a user. The release button 101 is configured to enable two-stage operation of half press and full press. When the user performs a half-press operation of the release button 101, the camera controller 103 performs an autofocus operation. When the user performs a full-press operation of the release button 101, the camera controller 103 records image data generated depending on the timing of the full-press operation on a memory card 120 described later.

The setting part 102 is configured to allow the user to set various setting conditions of the imaging device 1. In the embodiment, the setting part 102 is configured to allow the user to set a rotation range of a focus ring 203 included in the interchangeable lens unit 200. The setting part 102 is a hardware-key operation part such as an operation button and an operation lever disposed on an exterior of the digital camera 100 except the release button 101 and accepts an operation by the user. The setting part 102 includes, for example, a joystick having a lever integrated with a button, a D-pad, and a touch panel. The configuration of the setting part 102 will be described in detail later.

The camera controller 103 controls parts such as the CMOS image sensor 104 in accordance with an instruction from operation parts such as the release button 101 and the setting part 102 and thereby controls an overall operation of the imaging device 1. Specifically, the camera controller 103 transmits a vertical synchronization signal to a timing generator (TG) 105 and generates an exposure synchronization signal based on the vertical synchronization signal. The camera controller 103 periodically repeatedly transmits the generated exposure synchronization signal to the interchangeable lens unit 200 via a body mount 112 described later. As a result, the camera controller 103 controls the interchangeable lens unit 200 in synchronization with the timing of exposure. The camera controller 103 includes a CPU etc., and the CPU executes a program (software) to implement a predetermined function. The camera controller 103 may include a processor made up of a dedicated electronic circuit designed to implement a predetermined function, instead of the CPU. Therefore, the camera controller 103 can be implemented by various processors such as a CPU, an MPU, a GPU, a DSU, an FPGA, and an ASIC. The camera controller 103 may be made up of one or more processors. The camera controller 103 may be made up of one semiconductor chip together with an image processing part 107 etc. The camera controller 103 uses a DRAM 106 as a work memory at the time of control operation and image processing operation.

The CMOS image sensor 104 takes an object image entering through the interchangeable lens unit 200 to generate image data. The CMOS image sensor 104 includes, for example, a light receiving element, an AGC (gain control amplifier), and an AD converter. The light receiving element converts an optical signal collected by the interchangeable lens unit 200 into an electric signal to generate image data. The AGC amplifies the electric signal output from the light receiving element. The AD converter converts the electric signal output from the AGC into a digital signal.

The CMOS image sensor 104 operates at timing controlled by the timing generator 105. The operation of the CMOS image sensor 104 includes a still-image taking operation, a through-image taking operation, a data transfer operation, an electronic shutter operation, etc. Image information generated by the CMOS image sensor 104 is supplied to the image processing part 107.

The image processing part 107 performs predetermined image processing on the image data converted into a digital signal by the CMOS image sensor 104. The predetermined image processing is, for example, gamma correction processing, white balance correction processing, flaw correction processing, YC conversion processing, digital zoom processing, compression processing, and decompression processing. The image data processed by the image processing part 107 is transmitted via the camera controller 103 to a liquid crystal monitor 108 that is an example of a display part and a flash memory 109.

The liquid crystal monitor 108 is a display panel disposed on a back surface of the camera body 100. The liquid crystal monitor 108 displays an image represented by the image data for display processed by the image processing part 107. The liquid crystal monitor 108 is configured to be able to selectively display a moving image and a still image. The liquid crystal monitor 108 is configured to be able to display information such as setting conditions set by the user in the setting part 102, in addition to the images.

The flash memory 109 functions as an internal memory for storing various data including the image data processed by the image processing part 107. The flash memory 109 also stores programs and parameters used when the camera controller 103 provides control.

The camera body 100 also includes a card slot 110 to which the memory card 120 is detachably connected, a power source 111, and the body mount 112.

The card slot 110 is configured such that the memory card 120 can electrically and mechanically be connected. The memory card 120 is an external memory internally including a storage element such as a flash memory. The memory card 120 stores various data including the image data processed by the image processing part 107. For example, various data stored in the memory card 120 are read by the camera controller 103 via the card slot 110 and displayed on the liquid crystal monitor 108.

The power source 111 supplies electric power for driving the imaging device 1. The power source 111 may be, for example, a dry cell battery or a rechargeable battery, or may supply electric power externally supplied through a power cord to the imaging device 1. When the power source 111 is turned on, the camera controller 103 supplies electric power to parts of the camera body 100. The camera controller 103 also supplies electric power via the body mount 112 to the interchangeable lens unit 200. The electric power is supplied by a lens controller 205 described later to parts of the interchangeable lens unit 200.

The body mount 112 is configured to be mechanically and electrically connectable to the lens mount 201 included in the interchangeable lens unit 200. The body mount 112 is configured to be able to transmit and receive data between the camera body 100 and the interchangeable lens unit 200 via the lens mount 201. The body mount 112 transmits the exposure synchronization signal and other control signals received from the camera controller 103 to the lens controller 205 via the lens mount 201. The body mount 112 transmits a signal received from the lens controller 205 via the lens mount 201 to the camera controller 103.

The interchangeable lens unit 200 includes a lens mount 201. The lens mount 201 is configured to be mechanically and electrically connectable to the body mount 112. The lens mount 201 is supplied with electric power via the body mount 112 and supplies the electric power to parts of the interchangeable lens unit 200.

The interchangeable lens unit 200 includes an optical system OP including a focus lens 202 that is an example of a lens, a focus ring 203 that is an example of an operation ring, a lens drive part 204, and the lens controller 205 that is an example of a control part.

The optical system OP is a combination of optical members for forming an object image on an imaging surface of the CMOS image sensor 104. The focus lens 202 is a lens for changing a focus state of the object image formed on the imaging surface of the CMOS image sensor 104. The focus lens 202 is made up of one or more lenses.

The focus ring 203 is an infinite rotation type ring-shaped member having no mechanical restriction on a rotation range. The focus ring 203 is a manual focus ring for manually performing focusing. The focus ring 203 is rotatably disposed on a cylindrical exterior member of the interchangeable lens unit 200 such that a rotation axis is positioned parallel to an optical axis direction A1 of the optical system OP.

The lens drive part 204 moves the focus lens 202 forward and backward in the optical axis direction A1 of the optical system OP. As the focus lens 202 moves forward and backward in the optical axis direction A1, the focus state of the object image formed on the CMOS image sensor 104 changes. In the embodiment, the lens drive part 204 moves the focus lens 202 forward and backward from an infinite end that is an example of a first position to a closest end that is an example of a second position. The "infinite end" is the position closest to the infinity focus among focusable positions of the focus lens 202 determined in design. The "closest end" is the position closest to the closest focus among the focusable positions of the focus lens 202 determined in design. The "infinite end" and the "closest end" are also referred to as "drive ends". The lens drive part 204 is, for example, a motor such as a stepping motor, a DC motor, and an ultrasonic motor.

The lens controller 205 controls the overall operation of the interchangeable lens unit 200 in accordance with control from the camera controller 103. The lens controller 205 includes a CPU etc., and the CPU executes a program (software) to implement a predetermined function. The lens controller 205 may include a processor made up of a dedicated electronic circuit designed to implement a predetermined function, instead of the CPU. Therefore, the lens controller 205 can be implemented by various processors such as a CPU, an MPU, a GPU, a DSU, an FPGA, and an ASIC. In the embodiment, the lens controller 205 controls the drive of the lens drive part 204 to move the focus lens 202 depending on a rotation amount (e.g., a rotation angle) of the focus ring 203. The lens controller 205 drives the lens drive part 204 such that the focus lens 202 moves forward and backward from the infinite end to the closest end when the focus ring 203 is rotated in a specific rotation range. In the embodiment, the "specific rotation range" is a rotation range set in the setting part 102.

The lens controller 205 receives information of the rotation amount of the focus ring 203 detected by a rotation amount detecting part 206 and transmits the information via the lens mount 201 and the body mount 112 to the camera controller 103. The lens controller 205 controls the drive of the lens drive part 204 based on the information stored in a flash memory 207 and a DRAM 208 depending on the rotation amount of the focus ring 203 detected by the rotation amount detecting part 206 under the control of the camera controller 103.

The lens controller 205 uses the DRAM 208 as a work memory when controlling the drive of the lens drive part 204 etc. In the embodiment, the DRAM 208 functions as a storage part assigning and storing respective different rotation amounts of the focus ring 203 to multiple positions within the movement stroke of the focus lens 202 in accordance with the rotation range set in the setting part 102.

The rotation amount detecting part 206 detects the rotation amount of the focus ring 203. The rotation amount detecting part 206 is a rotary encoder, for example.

Figure 2:
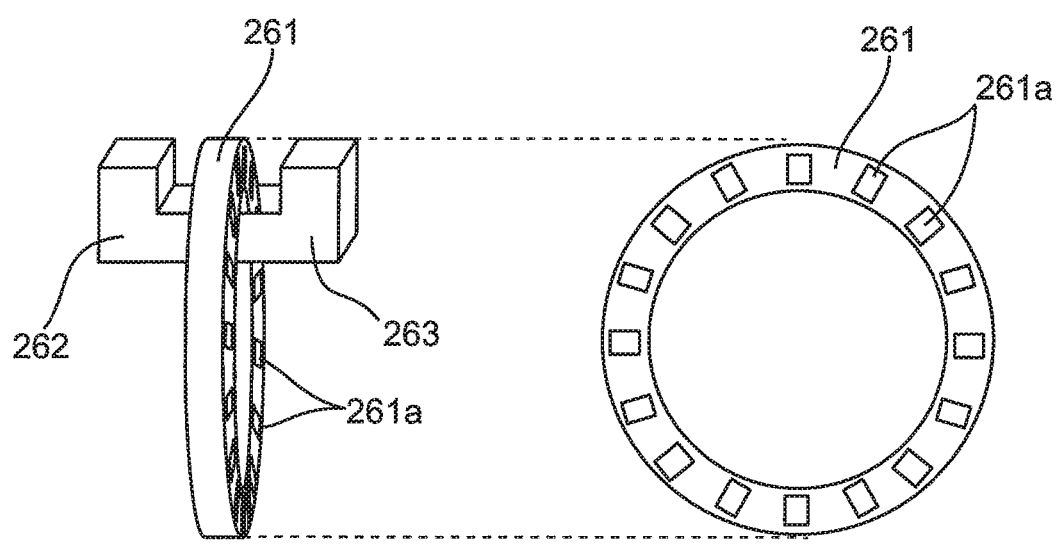
FIG. 2 is an explanatory view schematically showing a configuration example of a rotation amount detecting part included in the imaging device of FIG. 1.

FIG. 2 is an explanatory view schematically showing a configuration example of the rotation amount detecting part 206. As shown in FIG. 2, the rotation amount detecting part 206 includes a rotating body 261, a light emitting part 262, and a light receiving part 263. The rotating body 261 is formed into an annular shape. The rotating body 261 is attached to rotate integrally with the focus ring 203. The rotating body 261 has a plurality of slits 261a penetrating in the thickness direction and arranged at constant pitches in the circumferential direction. The light emitting part 262 and the light receiving part 263 are arranged to face each other via the rotating body 261. The light emitting part 262 includes two light emitting elements (not shown). The light receiving part 263 includes two light receiving elements (not shown) at positions corresponding to the two light emitting elements.

Figure 3:
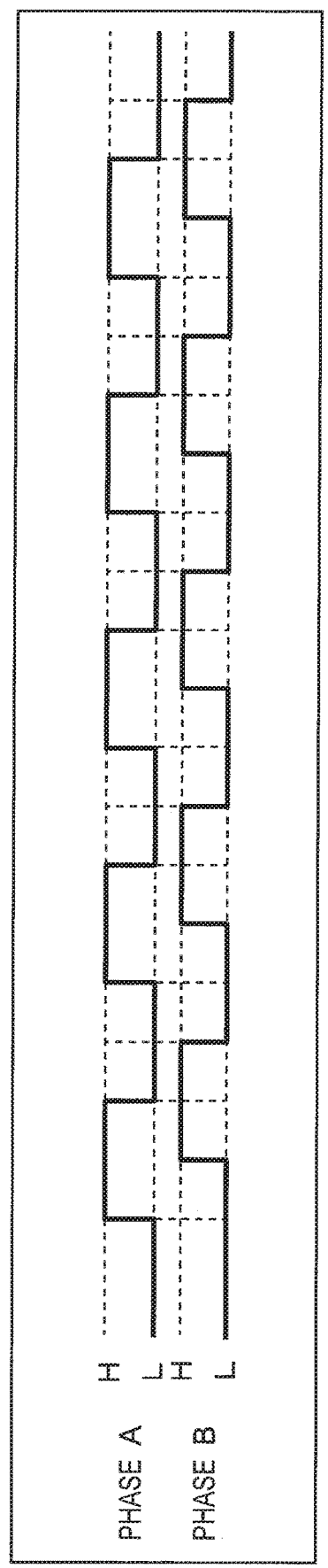
FIG. 3 is a diagram showing a waveform obtained by converting a light emitted from a light emitting part and received by a light receiving part into an electric signal in the rotation amount detecting part included in the imaging device of FIG. 1 and a count value of a counter.

FIG. 3 is a diagram showing a waveform obtained by converting a light emitted from the light emitting part 262 and received by the light receiving part 263 into an electric signal. In FIG. 3, a phase A indicates an electric signal converted from the light emitted from one of the light emitting elements and received by one of the light receiving elements, and a phase B indicates an electric signal converted from the light emitted from the other light emitting element and received by the other light receiving element. As the rotating body 261 rotates, the light emitted from the light emitting elements are intermittently received by the light receiving elements. Therefore, the phase A and the phase B has a pulse-like waveform. One set of the light emitting and light receiving elements and the other set of the light emitting and light receiving elements are arranged such that the phase A and the phase B are shifted, for example, a phase difference of 90 degrees is formed. The rotation detecting part 260 includes ports directly connecting the phase A and the phase B to the lens controller 205 and has a function of notifying the lens controller 205 through these ports of event information of switching of each of the phases A and B from L (Low) to H (High) and H to L. The lens controller 205 can calculate the rotation amount of the focus ring 203 by counting the event information. The lens controller 205 can detect the rotation direction of the focus ring 203 by detecting which of the phases A, B switches earlier from L to H or H to L from a resting state. In this way, the lens controller 205 decides addition or subtraction of a counter depending on the rotation direction.

The flash memory 207 stores programs, parameters, lens data, etc. used when controlling the lens controller 205. In this case, the lens data includes a lens name, a lens ID, a serial number, an F number, a focal distance, the presence/absence of a motorized zoom function, resolution characteristic information, characteristic values unique to the interchangeable lens unit 200, etc. In the embodiment, the characteristic values of the interchangeable lens unit 200 include information of a maximum rotation amount and a minimum rotation amount of the focus ring 203 assignable to multiple positions within the movement stroke from the infinite end to the closest end of the focus lens 202. Therefore, the flash memory 207 also functions as a rotation amount storage part storing information of the maximum rotation amount and the minimum rotation amount of the focus ring 203 assignable to multiple positions within the movement stroke of the focus lens 202. The lens data stored in the flash memory 207 is transmitted to the camera controller 103 by the lens controller 205. The camera controller 103 performs various control operations based on the lens data.

Figure 4:
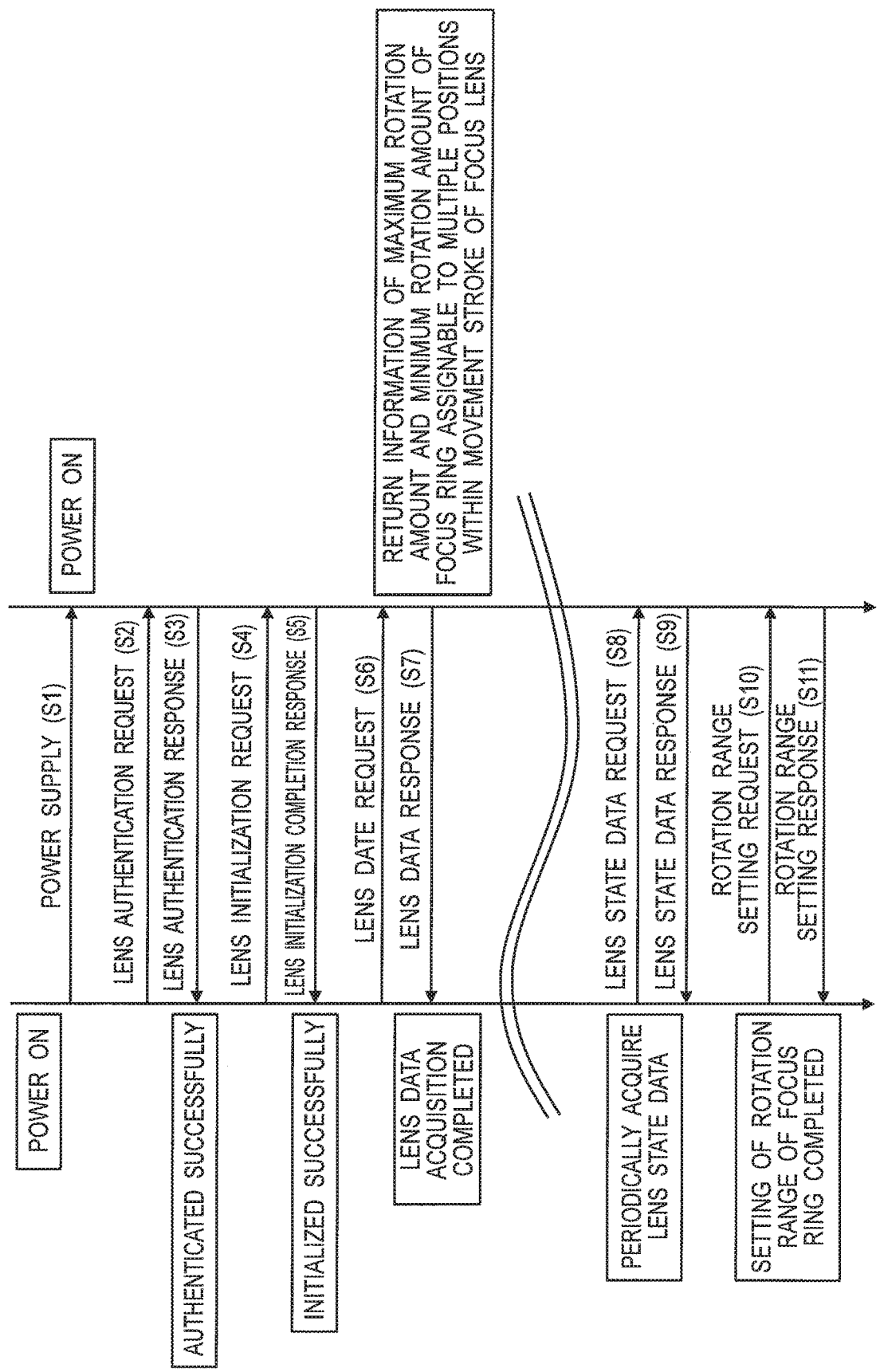
FIG. 4 is a sequence diagram showing an example of an initial setting operation of the imaging device of FIG. 1.

An example of an initial setting operation of the imaging device 1 will be described. FIG. 4 is a sequence diagram showing an example of the initial setting operation of the imaging device 1. This initial setting operation is first executed when the imaging device 1 is powered on.

First, the interchangeable lens unit 200 is attached to the camera body 100.

Subsequently, the user operates a power switch (not shown) to turn on the power source 111 of the camera body 100, and the power source 111 supplies electric power via the body mount 112 and the lens mount 201 to the interchangeable lens unit 200 (step S1). As a result, the interchangeable lens 200 is brought into a power-on state.

Subsequently, the camera controller 103 makes a request for authentication information of the interchangeable lens unit 200 to the lens controller 205 (step S2). The authentication information of the interchangeable lens unit 200 includes information on whether the interchangeable lens unit 200 is mounted on the camera body 100 and information on whether accessories are mounted.

Subsequently, the lens controller 205 responds to the lens authentication request from the camera controller 103 (step S3). As a result, the camera controller 103 can complete lens authentication and recognize whether the interchangeable lens unit 200 is mounted on the camera body 100 and whether accessories such as a teleconverter lens and a wide converter lens are mounted.

Subsequently, the camera controller 103 requests the lens controller 205 to perform an initialization operation (step S4). This causes the lens controller 205 to perform the lens initialization operation of various lenses included in the optical system OP, such as moving the focus lens 202 to the initial position.

Subsequently, the lens controller 205 returns a response indicative of the completion of the lens initialization operation to the camera controller 103 (step S5). As a result, the camera controller 103 can recognize that the lens initialization operation is completed.

Subsequently, the camera controller 103 makes a request for the lens data described above to the lens controller 205 (step S6). The lens data is stored in the flash memory 207. In the embodiment, the lens data includes information of the maximum rotation amount and the minimum rotation amount of the focus ring 203 assignable to multiple positions within the movement stroke of the focus lens 202.

Subsequently, the lens controller 205 reads the lens data from the flash memory 207 and returns the lens data to the camera controller 103 (step S7). As a result, the camera controller 103 stores the acquired lens data in the flash memory 109. When the camera controller 103 completes acquisition of the lens data, the imaging device 1 can take an image in this state.

In this state, the camera controller 103 periodically makes a request for lens state data indicative of a state of the interchangeable lens unit 200 to the lens controller 205 (step S8). In this case, the lens state data is, for example, position information of the focus lens 202 and information of the rotation amount of the focus ring 203.

Subsequently, the lens controller 205 returns the requested lens state data to the camera controller 103 (step S9). As a result, the camera controller 103 stores the lens state data received from the lens controller 205 in the DRAM 208.

When the rotation range of the focus ring 203 is set in the setting part 102, the camera controller 103 requests the lens controller 205 to set the rotation range of the focus ring 203 to the rotation range set in the setting part 102. (step S10).

Subsequently, the lens controller 205 assigns respective different rotation amounts of the focus ring 203 to multiple positions within the movement stroke from the infinite end to the closest end of the focus lens 202 and stores the rotation amounts in the DRAM 208. Subsequently, the lens controller 205 returns a response indicative of the completion of setting of the rotation range of the focus ring 203 to the camera controller 103 (step S11). As a result, the camera controller 103 can recognize that the setting of the rotation range of the focus ring 203 is completed.

The configuration of the setting part 102 will be described in more detail.

As described above, the setting part 102 is configured to allow the user to set the rotation range of the focus ring 203. In the embodiment, the setting part 102 is configured to enable setting of the rotation range of the focus ring 203 within the range from the maximum rotation amount to the minimum rotation amount stored in the flash memory 207 of the interchangeable lens unit 200 attached to the camera body 100.

Figure 5:
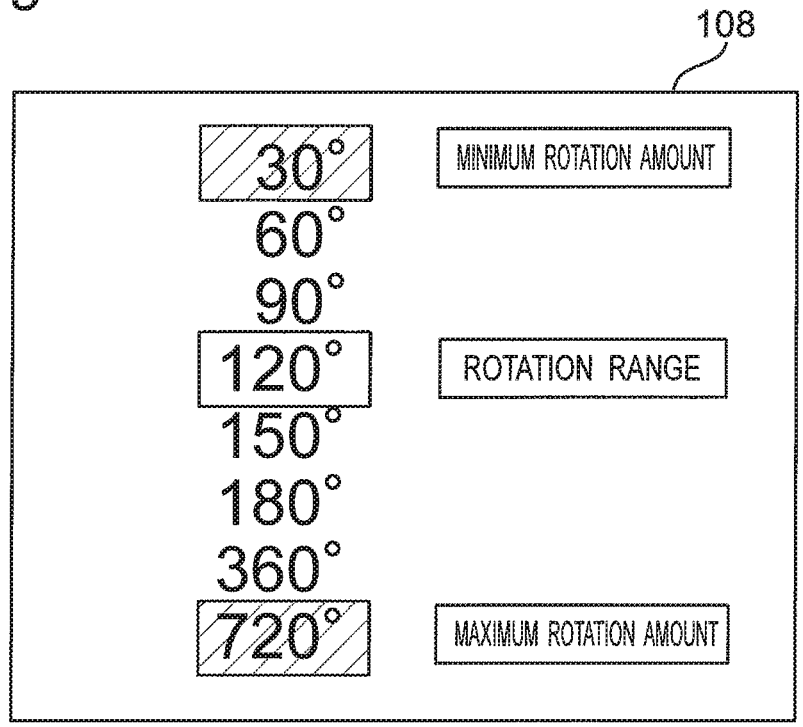
FIG. 5 is a diagram showing a display example of a rotation amount displayed on a liquid crystal monitor.
Figure 6:
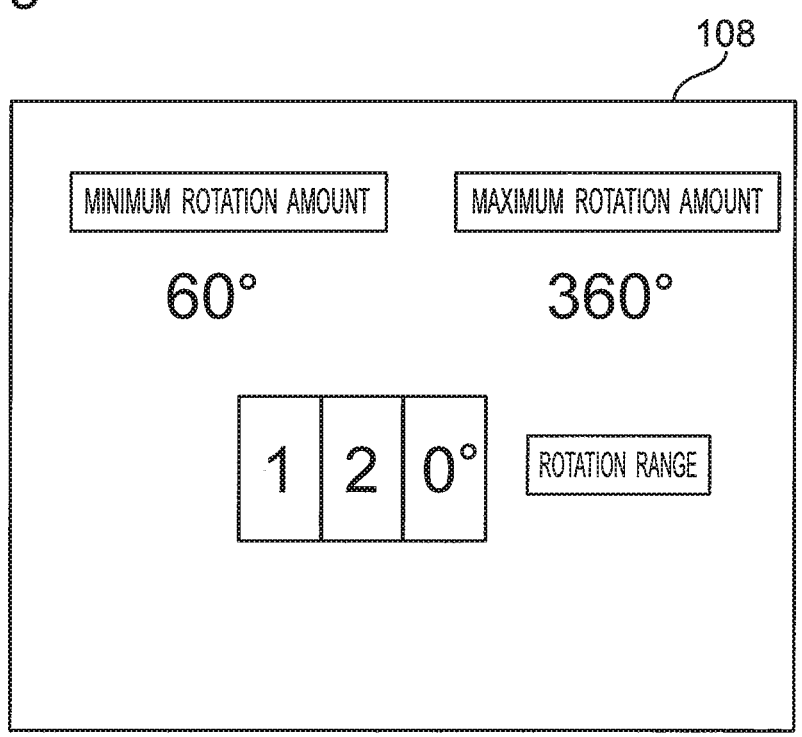
FIG. 6 is a diagram showing a display example of a rotation amount displayed on the liquid crystal monitor.

In the embodiment, the liquid crystal monitor 108 displays the multiple rotation amounts within the range from the maximum rotation amount to the minimum rotation amount stored in the flash memory 207. FIGS. 5 and 6 are diagrams showing display examples of the rotation amount displayed on the liquid crystal monitor 108.

In the example shown in FIG. 5, the maximum rotation amount and the minimum rotation amount stored in the flash memory 207 are 720 degrees and 30 degrees, respectively. The liquid crystal monitor 108 displays rotation amounts of 30 degrees, 60 degrees, 90 degrees, 120 degrees, 150 degrees, 180 degrees, 360 degrees, and 720 degrees within the range from the maximum rotation amount to the minimum rotation amount. The setting part 102 is configured such that any one of the multiple rotation amounts displayed on the liquid crystal monitor 108 can be selected. Therefore, the user can set a desired rotation amount as the rotation range of the focus ring 203 out of these rotation amounts in the setting part 102.

For example, it is assumed that the user sets 120 degrees displayed on the liquid crystal monitor 108 as the rotation range of the focus ring 203. In this case, the lens controller 205 assigns respective different rotation amounts of the focus ring 203 to multiple positions within the movement stroke of the focus lens 202 and stores the rotation amounts in the DRAM 208. Specifically, when the focus lens 202 is located at the infinite end, 0 degrees are assigned as the rotation amount of the focus ring 203. When the focus lens 202 is located at the closest end, 120 degrees are assigned as the rotation amount of the focus ring 203. As the position of the focus lens 202 approaches from the infinite end to the closest end, the rotation amount of the focus ring 203 assigned to the position is proportionally increased.

In the example shown in FIG. 6, the maximum rotation amount and the minimum rotation amount stored in the flash memory 207 are 360 degrees and 60 degrees, respectively. The liquid crystal monitor 108 is configured to display a plurality of rotation amounts within the range from the maximum rotation amount to the minimum rotation amount at different timings. Therefore, in the example shown in FIG. 6, instead of displaying a plurality of rotation amounts at one time, a rotation amount input by the user is displayed. The user can set (e.g., input) an arbitrary rotation amount within the range from the maximum rotation amount to the minimum rotation amount as the rotation range of the focus ring 203 in the setting part 102. For example, when the user sets 120 degrees displayed on the liquid crystal monitor 108 as the rotation range of the focus ring 203, the information stored in the DRAM 208 by the lens controller 205 is as described above.

The lens controller 205 drives the lens drive part 204 such that the focus lens 202 is moved to a position corresponding to the rotation amount stored in the DRAM 208 depending on the rotation amount of the focus ring 203. As a result, the use can move the focus lens 202 forward and backward from the infinite end to the closest end by rotating the focus ring 203 within the rotation range set in the setting part 102, and the usability can further be improved.

The setting part 102 is configured such that either a first mode for moving the focus lens 202 depending on the rotation amount of the focus ring 203 or a second mode for moving the focus lens 202 depending on the rotation speed of the focus ring 203 can be selected. In the embodiment, the setting part 102 is configured to determine that the second mode is selected as the control mode unless the first mode is selected and to notify the interchangeable lens unit 200. The information of the control mode supplied to the interchangeable lens unit 200 is stored in the DRAM 208.

Figure 7:
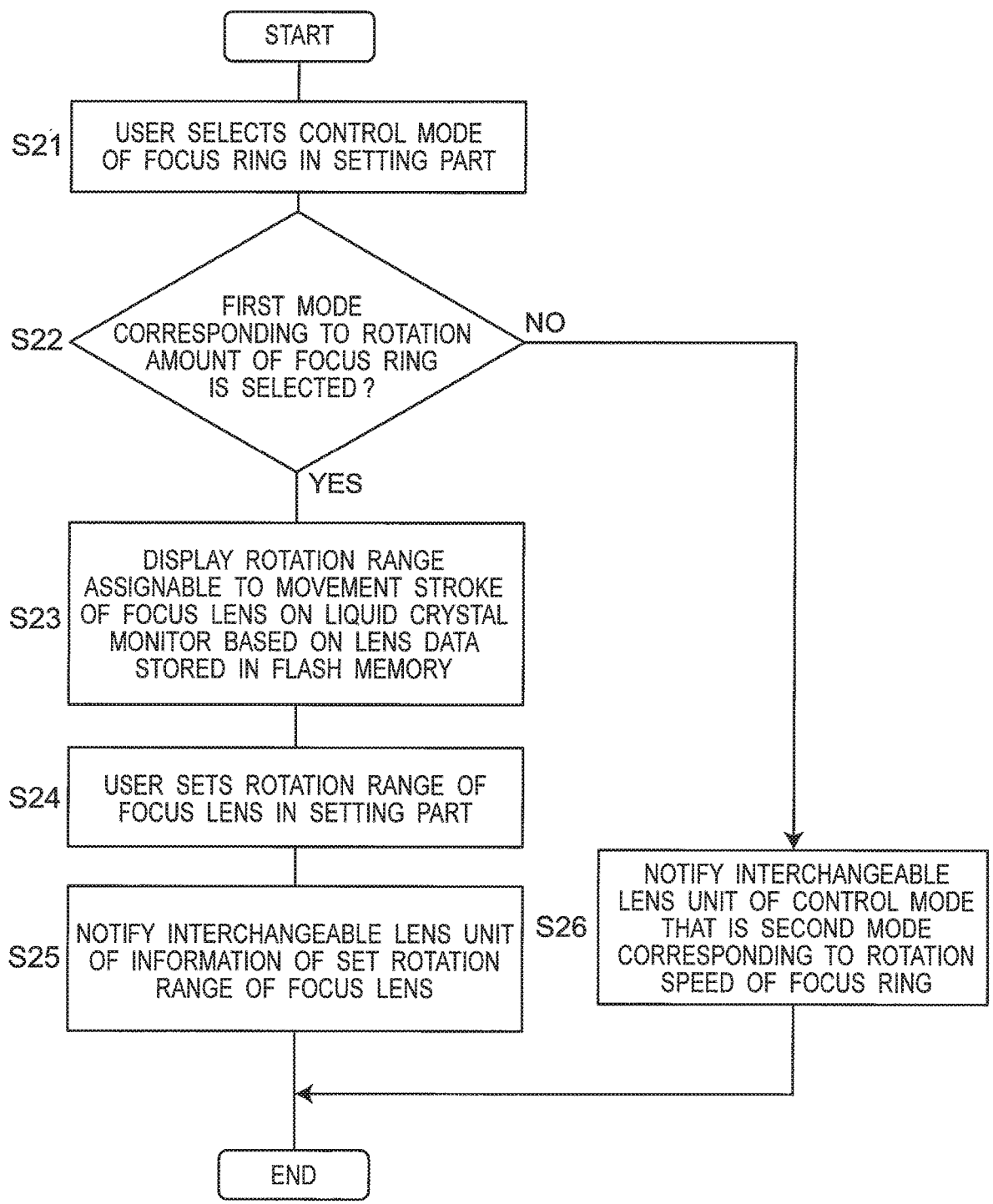
FIG. 7 is a flowchart showing an example of a control flow when a control mode of a focus ring is selected in a setting part.

FIG. 7 is a flowchart showing an example of a control flow when the control part of the focus ring 203 is selected in the setting part 102.

First, the user selects the control mode of the focus ring 203 in the setting part 102 (step S21).

Subsequently, the camera controller 103 determines whether the first mode corresponding to the rotation amount of the focus ring 203 is selected (step S22).

When the first mode is selected at step S22, the camera controller 103 displays the rotation range assignable to the movement stroke of the focus lens 202 on the liquid crystal monitor 108 based on the lens data stored in the flash memory 207 (step S23).

Subsequently, the user sets the rotation range of the focus lens 202 in the setting part 102 based on the display on the liquid crystal monitor 108 (step S24).

Subsequently, the camera controller 103 notifies the interchangeable lens unit 200 of information of the rotation range of the focus ring 203 set in the setting part 102 (step S25). This enables the lens controller 205 of the interchangeable lens unit 200 to drive the lens drive part 204 in the first mode corresponding to the rotation amount of the focus ring 203.

When the first mode is not selected at step S22, the camera controller 103 notifies the interchangeable lens unit 200 of the control mode that is the second mode corresponding to the rotation speed of the focus ring 203 (step S26). This enables the lens controller 205 of the interchangeable lens unit 200 to drive the lens drive part 204 in the second mode corresponding to the rotation speed of the focus ring 203.

If the lens drive part 204 is driven in the first mode corresponding to the rotation amount of the focus ring 203, and the focus ring 203 is of the infinite rotation type, the focus ring 203 may be rotated beyond the rotation range set in the setting part 102. In this case, the rotation position of the focusing ring 203 in focus is deviated, and the imaging device is not bought into focus even if the focusing ring 203 is rotated in the opposite direction to the original position. Therefore, the imaging device 1 further includes an excess rotation amount storage part storing an excess rotation amount of the focus ring 203 rotated in one direction beyond a rotation range set in the setting part 102 when the focus ring 203 is rotated in one direction beyond the rotation range. In the embodiment, the DRAM 208 also functions as the excess rotation amount storage part.

The setting part 102 is configured such that whether to control the drive of the lens drive part 204 based on the excess rotation amount stored in the DRAM 208 can be selected. A function of controlling the drive of the lens drive part 204 based on the excess rotation amount will hereinafter eb referred to as a "slip function". In other words, the setting part 102 is configured such that enabling/disabling of the slip function can be selected. In the embodiment, the setting part 102 is configured to determine that the disabling of the slip function is selected unless the enabling of the slip function is selected and to notify the interchangeable lens unit 200. The information of the slip function supplied to the interchangeable lens unit 200 is stored in the DRAM 208.

When the focus ring 203 is rotated in one direction beyond the rotation range set in the setting part 102, the lens controller 205 stops the drive of the lens drive part 204 until the focus ring 203 is rotated in the opposite direction by the excess rotation amount.

Figure 8:
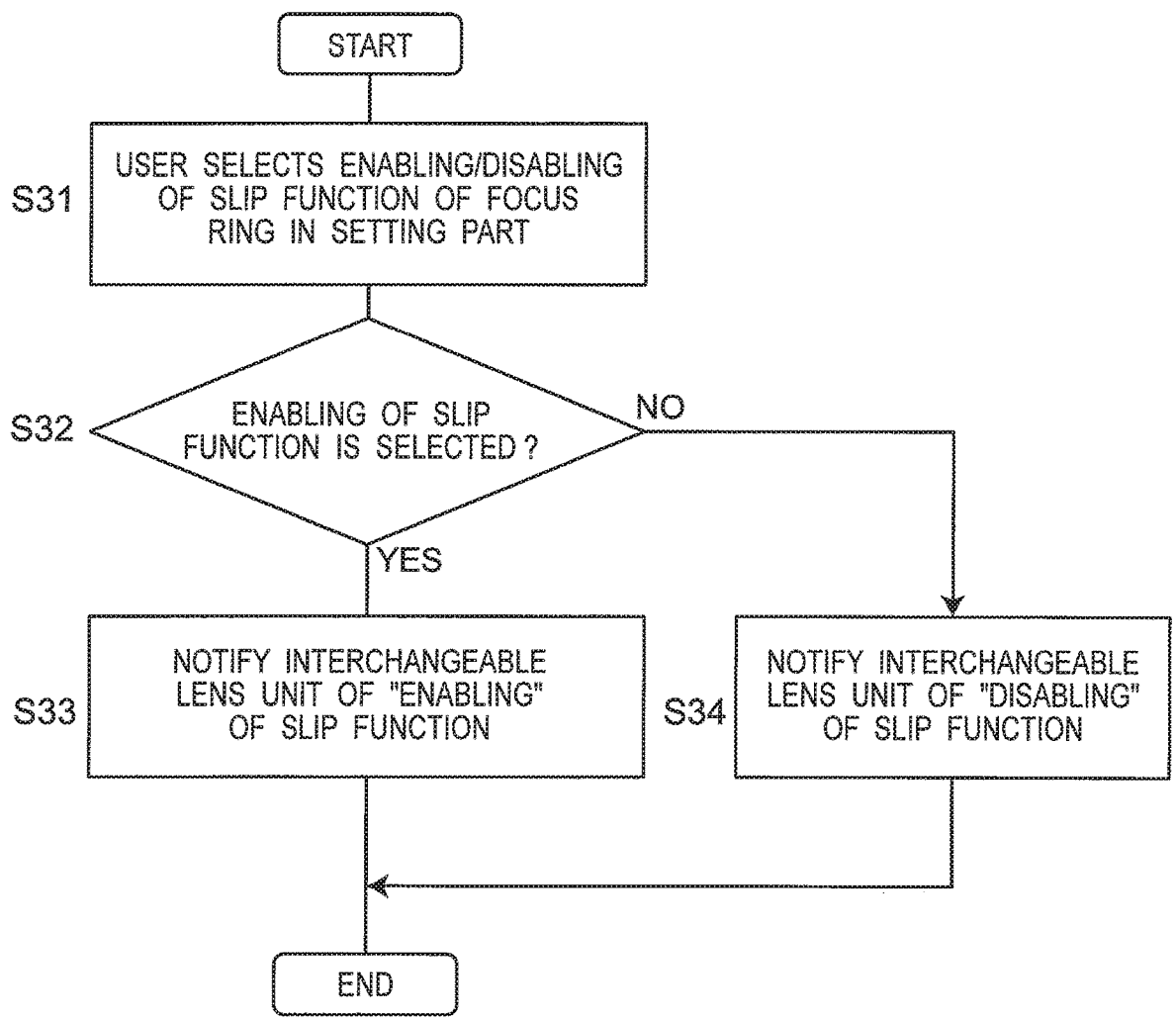
FIG. 8 is a flowchart showing an example of a control flow when enabling/disabling of a slip function is selected in the setting part.

FIG. 8 is a flowchart showing an example of a control flow when enabling/disabling of the slip function is selected in the setting part 102.

First, the user selects enabling/disabling of the slip function of the focus ring 203 in the setting part 102 (step S31).

Subsequently, the camera controller 103 determines whether the enabling of the slip function is selected (step S32).

When the enabling of the slip function is selected at step S32, the camera controller 103 notifies the interchangeable lens unit 200 of the enabling of the slip function (step S33).

As a result, the lens drive part 204 can be driven based on the excess rotation amount stored in the DRAM 208.

If the enabling of the slip function is not selected at step S32, the camera controller 103 notifies the interchangeable lens unit 200 of the disabling of the slip function (step S34). In this case, the lens drive part 204 is driven without being based on the excess rotation amount stored in the DRAM 208.

Figure 9:
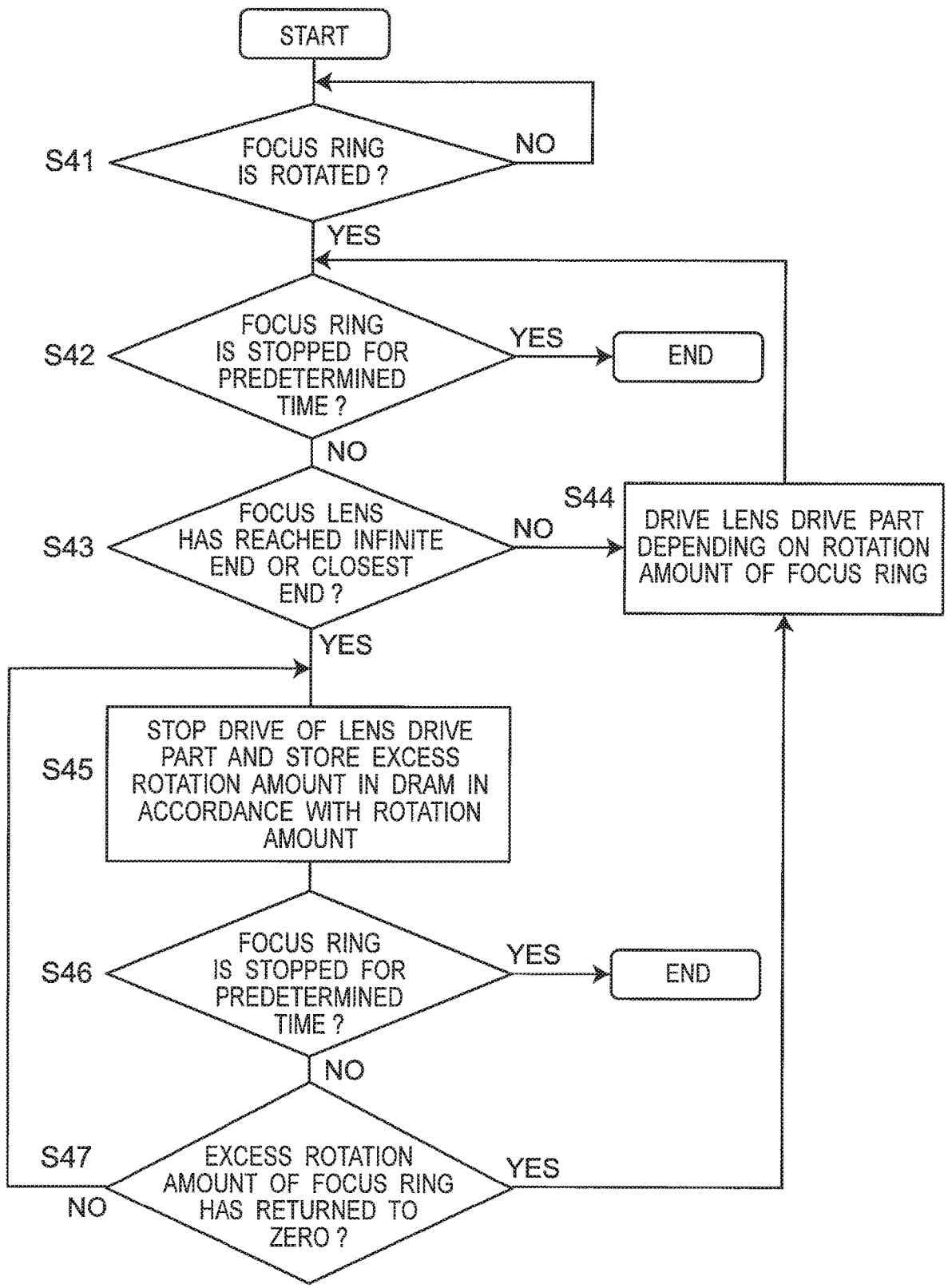
FIG. 9 is a flowchart showing an example of a control flow when the focus ring is rotated.
Figure 10A:
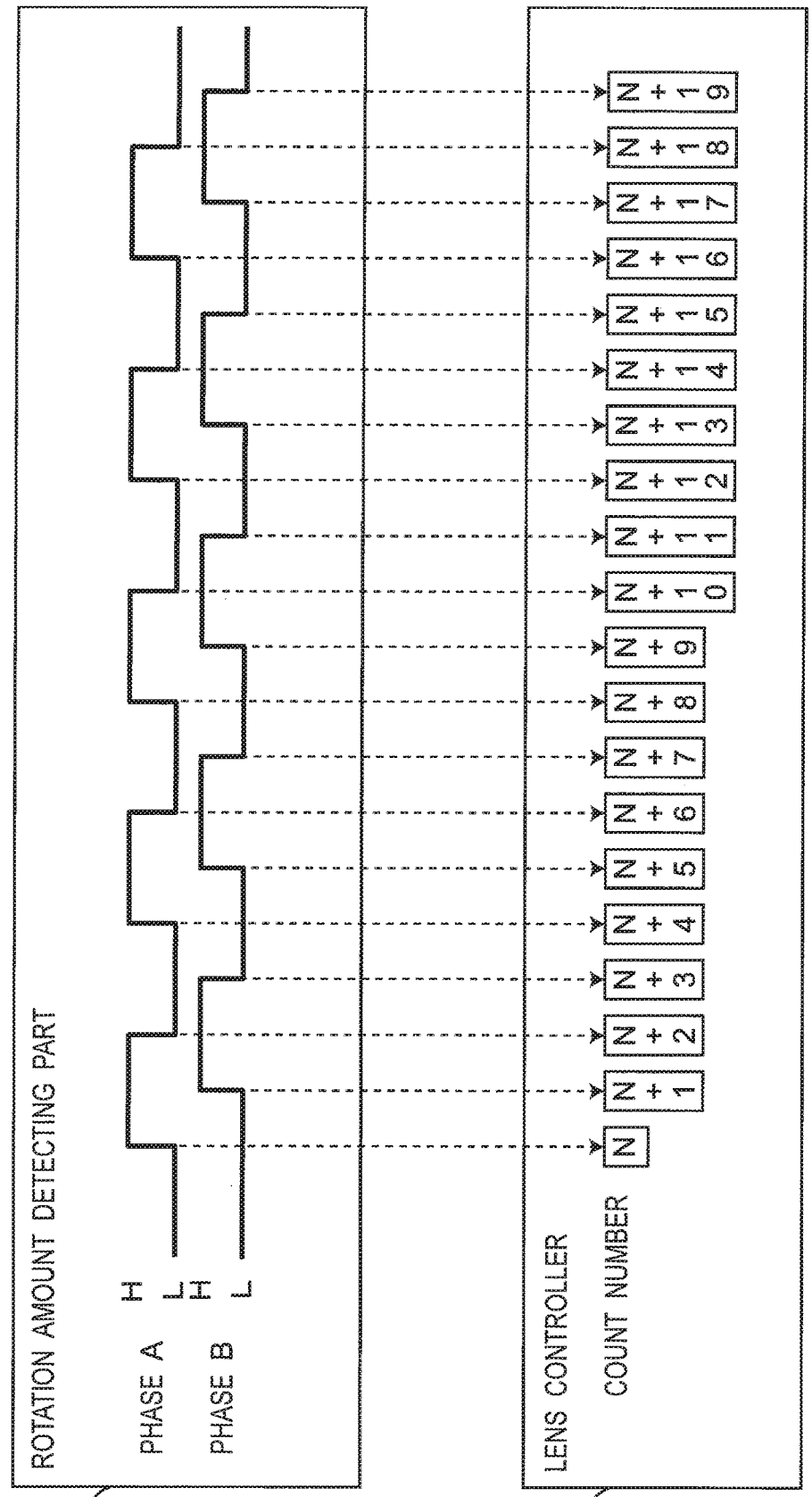
FIG. 10A is an explanatory diagram showing a principle of detection of an excess rotation amount by a lens controller based on event information supplied from the rotation amount detecting part when the focus ring is normally rotated.
Figure 10B:
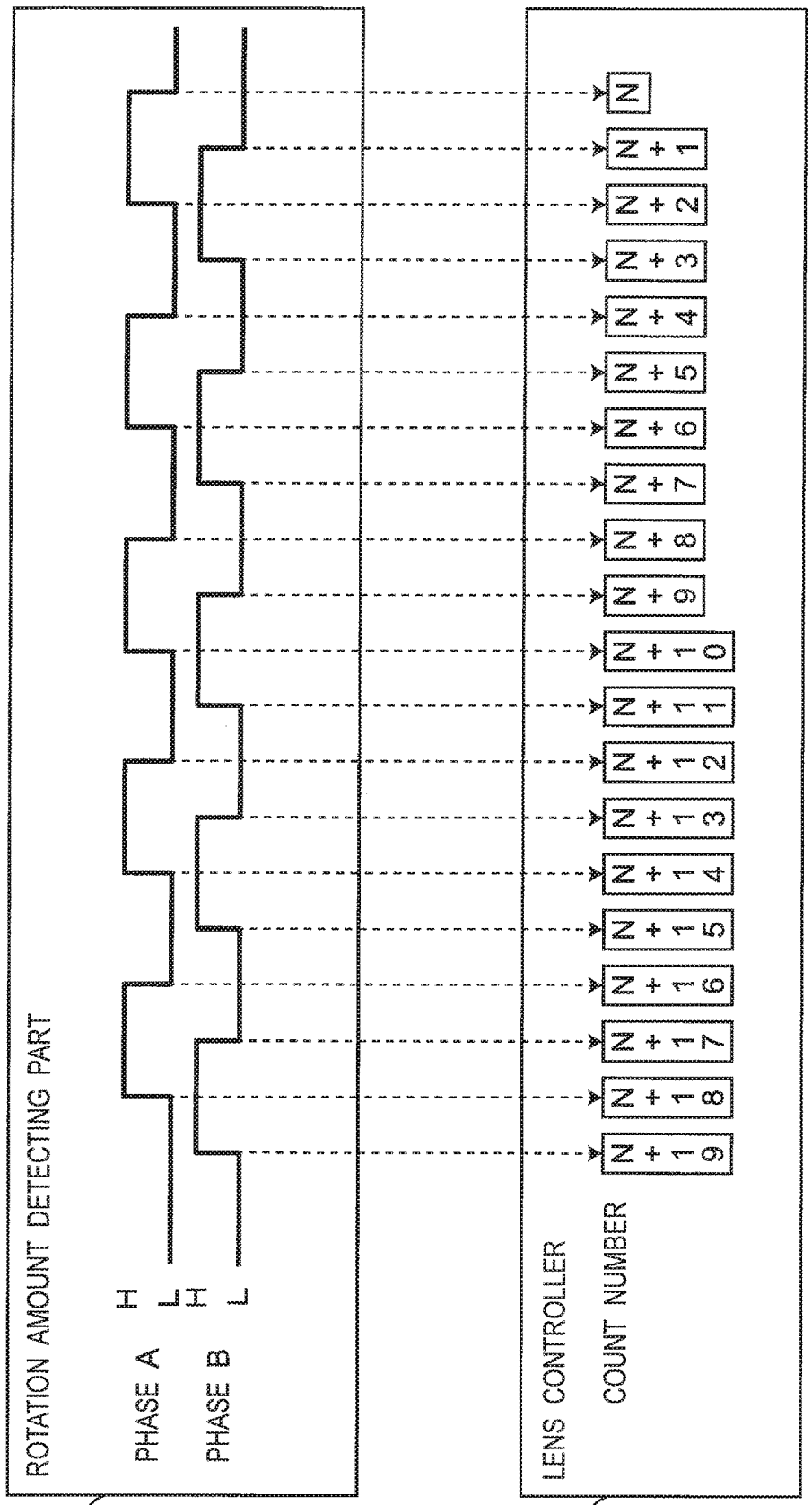
FIG. 10B is an explanatory diagram showing a principle of detection of an excess rotation amount by the lens controller based on the event information supplied from the rotation amount detecting part when the focus ring is reversely rotated.

FIG. 9 is a flowchart showing an example of a control flow when the focus ring 203 is rotated. FIG. 10A is an explanatory diagram showing a principle of detection of an excess rotation amount by the lens controller 205 based on the event information supplied from the rotation amount detecting part when the focus ring 203 is rotated in one direction (also referred to as normally rotated). FIG. 10B is an explanatory diagram showing a principle of detection of an excess rotation amount by the lens controller 205 based on the event information supplied from the rotation amount detecting part 206 when the focus ring 203 is rotated in the opposite direction (also referred to as reversely rotated). FIGS. 11A to 11E are schematic views showing the focus ring 203 being rotated. As shown in FIGS. 11A to 11E, it is assumed that an operation lever 209 is attached to rotate the focus ring 203. When the operation lever 209 is located at a lower limit of a rotation range $\theta 1$ (a left end portion in the drawings), the focus ring 203 is located at the closest end. When the operation lever 209 is located at an upper limit of the rotation range $\theta 1$ (a right end portion in the drawings), the focus ring 203 is located at the infinite end.

First, the lens controller 205 determines whether the focus ring 203 is rotated (step S41). The lens controller 205 continues the determination until it is determined that the focus ring 203 is rotated.

Subsequently, the lens controller 205 determines whether the focus ring 203 is stopped for a predetermined time after being rotated (step S42). If the focus ring 203 is stopped for a predetermined time, the lens controller 205 terminates the control.

Figure 11A:
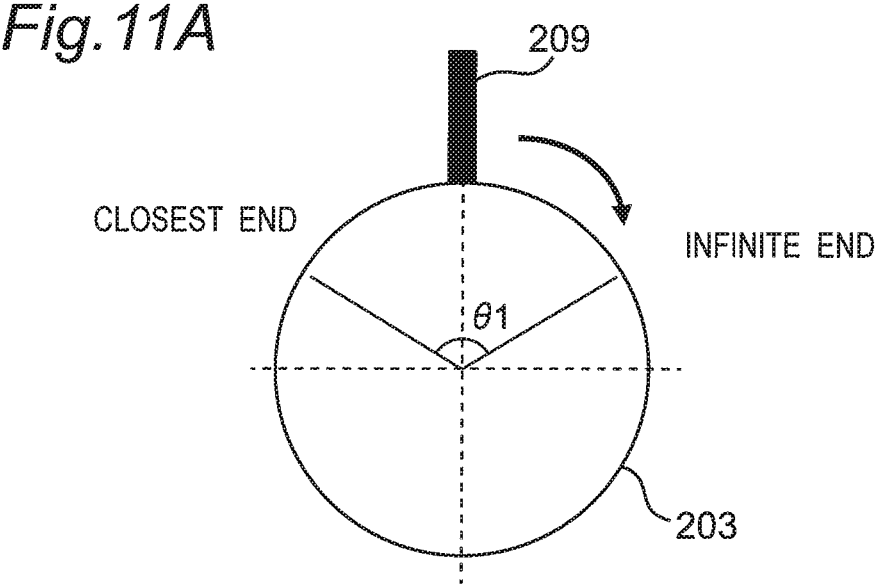
FIG. 11A is a schematic view showing the focus ring being rotated.

If it is determined that the focus ring 203 is not stopped for a predetermined time, the lens controller 205 determines whether the focus lens 202 has reached the infinite end or the closest end (step S43). In the embodiment, the lens controller 205 determines whether the focus lens 202 has reached the upper limit or the lower limit of the rotation range $\theta 1$ thereof stored in the DRAM 208 based on the rotation amount calculated based on the event information supplied from the rotation amount detecting part 206. FIG. 11A shows a state in which the operation lever 209 is located in the rotation range θ1 so that the focus lens 202 has not reached the infinite end or the closest end.

Figure 11B:
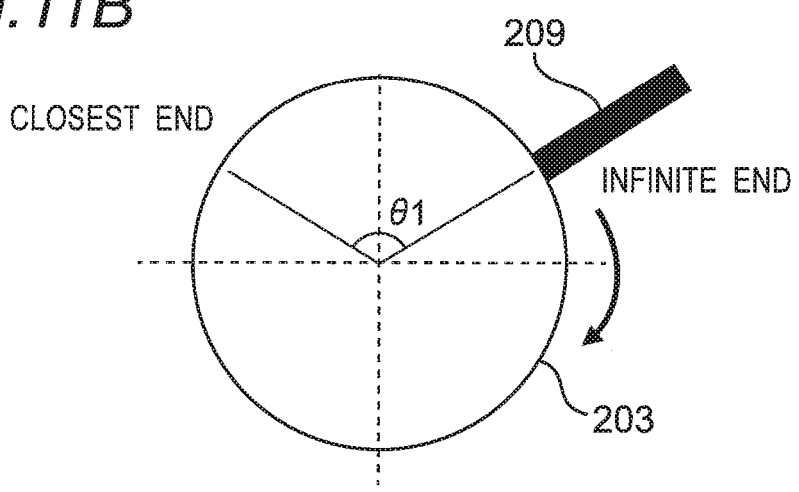
FIG. 11B is a schematic view showing the focus ring being rotated.

If it is determined that the focus lens 202 has not reached the infinite end or the closest end, the lens controller 205 drives the lens drive part 204 depending on the rotation amount detected by the rotation amount detecting part 206 (step S44). As a result, the focus lens 202 moves to a position corresponding to the rotation amount stored in the DRAM 208. After completion of step S44, the process returns to step S42. FIG. 11B shows a state in which the operation lever 209 is rotated to the upper limit of the rotation range θ1 so that the focus lens 202 has reached the infinite end. In this case, the excess rotation amount is zero.

Figure 11C:
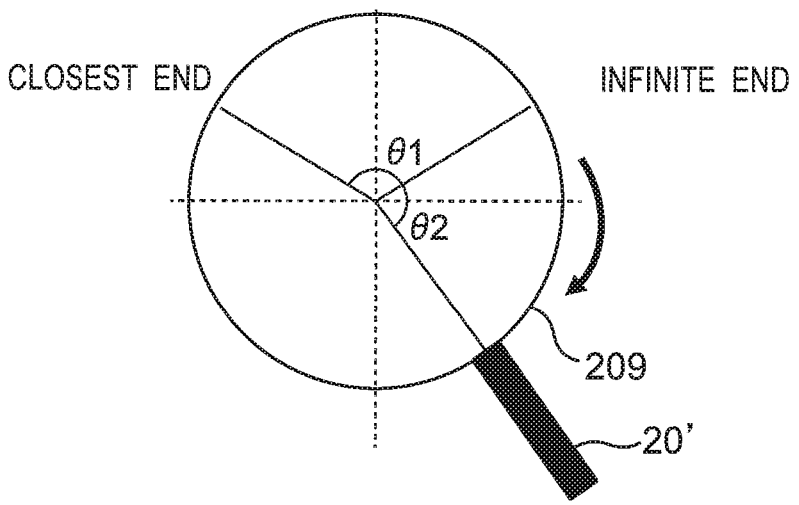
FIG. 11C is a schematic view showing the focus ring being rotated.

If it is determined that the focus lens 202 has reached the infinite end or the closest end, the lens controller 205 stops the drive of the lens drive part 204 and stores an excess rotation amount θ2 in the DRAM 208 in accordance with a rotation amount detected by the rotation amount detecting part 206 (step S45). FIG. 11C shows a state in which the operation lever 209 is rotated in one direction beyond the upper limit of the rotation range θ1 so that the focus ring 203 exceeds the infinite end by the excess rotation amount θ2.

For example, it is assumed that the focus ring 203 is normally rotated from the position shown in FIG. 11B to the position shown in FIG. 11C. In this case, the lens controller 205 stops the drive of the lens drive part 204 and stores the excess rotation amount θ2. As shown in FIG. 10A, at the time of normal rotation of the focus ring 203, the lens controller 205 detects an interrupt process generated at the occurrence of an event when the phase A and the phase B switch from L to H and H to L, respectively. At the timing of the interrupt process, the lens controller 205 adds a count value of a counter of the lens controller 205 to a count number N when the focus lens 202 reaches the infinite end. For example, when the counter of the lens controller 205 has a rotation angle resolution of 2 degrees, and the count value of the counter of the lens controller 205 is "N+19", the lens controller 205 performs a calculation of 38 (=2×19) degrees and then stores 38 degrees as the excess rotation amount θ2 in the DRAM 208. Subsequently, when the focus ring 203 is reversely rotated, as shown in FIG. 10B, the lens controller 205 detects an interrupt process generated at the occurrence of an event when the phase A and the phase B switch from L to H and H to L, respectively, as with the normal rotation. At the timing of the interrupt process, the lens controller 205 subtracts the count value of the counter of the lens controller 205 from the count number "N+19". For example, when the count value of the counter of the lens controller 205 is subtracted to "N+10", the lens controller 205 performs a calculation of 20 (=2×10) degrees, and the excess rotation amount θ2 is obtained as 20 degrees. The lens controller 205 stores this new excess rotation amount θ2 in the DRAM 208.

Subsequently, the lens controller 205 determines whether the focus ring 203 is stopped for a predetermined time (step S46). If the focus ring 203 is stopped for a predetermined time, the lens controller 205 terminates the control.

Figure 11D:
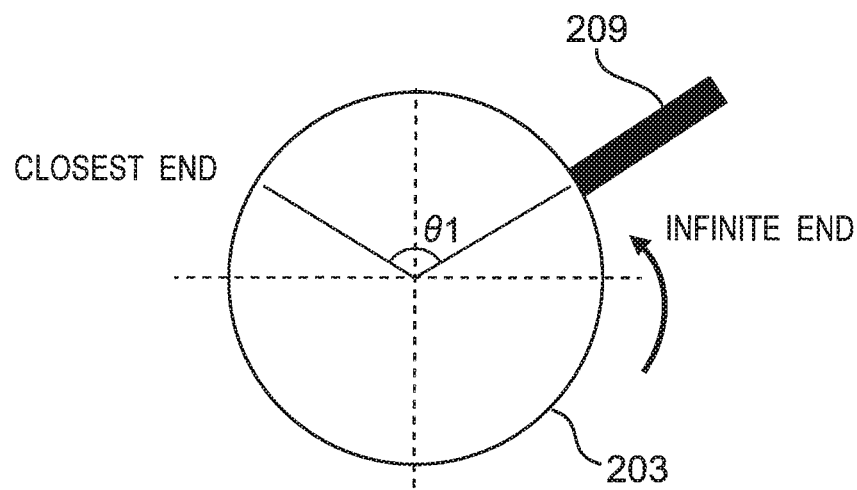
FIG. 11D is a schematic view showing the focus ring being rotated.

If it is determined that the focus ring 203 is not stopped for a predetermined time, the lens controller 205 determines whether the excess rotation amount θ2 has returned to zero (step S47). For example, when the count value of the counter of the lens controller 205 is "N", the excess rotation amount θ2 is zero. FIG. 11D shows a state in which the operation lever 209 is rotated in the opposite direction by the excess rotation amount θ2 so that the focus lens 202 has reached the infinite end.

Figure 11E:
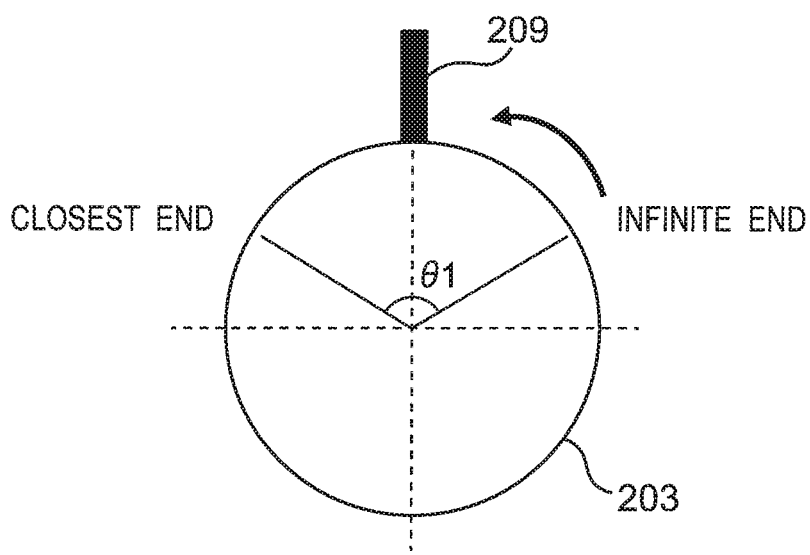
FIG. 11E is a schematic view showing the focus ring being rotated.

If it is determined that the excess rotation amount θ2 has not returned to zero, the lens controller 205 returns to step S45 and continues the control flow. On the other hand, when it is determined that the excess rotation amount θ2 has returned to zero, the lens controller 205 returns to step S44 and continues the control flow. Specifically, in this case, the lens controller 205 drives the lens drive part 204 depending on the rotation amount calculated based on the event information supplied from the rotation amount detecting part 206 and moves the focus lens 202 to the position corresponding to the rotation amount stored in the DRAM 208. FIG. 11E shows a state in which the operation lever 209 is rotated further than the excess rotation amount θ2 in the opposite direction, and the focus lens 202 has reached a position between the infinite end and the closest end.

In the imaging device 1 according to the embodiment, respective different rotation amounts of the focus ring 203 are assigned to multiple positions within the movement stroke of the focus lens 202 in accordance with the rotation range set in the setting part 102 and are stored in the DRAM 208. The lens controller 205 is configured to drive the lens drive part 204 to move the focus lens 202 depending on the rotation amount of the focus ring 203 to a position corresponding to the rotation amount stored in the DRAM 208. According to this configuration, since the user can set the rotation range of the focus ring 203 with the setting part 102 in accordance with an object, the usability can further be improved.

In the imaging device 1 according to the embodiment, the flash memory 207 stores information of the maximum rotation amount and the minimum rotation amount of the focus ring 203 assignable to multiple positions within the movement stroke of the focus lens 202. The setting part 102 is configured such that the rotation range of the focus ring 203 can be set within the range from the maximum rotation amount to the minimum rotation amount stored in the flash memory 207 of the interchangeable lens unit 200 attached to the camera body 100. According to this configuration, the rotation range of the focus ring 203 suitable for the interchangeable lens unit 200 can be set simply by attaching the interchangeable lens unit 200 to the camera body 100. Therefore, the usability can further be improved.

The imaging device 1 according to the embodiment includes the liquid crystal monitor 108 for displaying multiple rotation amounts within the range from the maximum rotation amount to the minimum rotation amount stored in the flash memory 207 of the interchangeable lens unit 200 attached to the camera body 100. The setting part 102 is configured such that any one of the multiple rotation amounts displayed on the liquid crystal monitor 108 can be selected as the rotation range of the focus ring 203. According to this configuration, since the selectable rotation range can be confirmed with the liquid crystal monitor 108, the usability can further be improved.

In the imaging device 1 according to the embodiment, the setting part 102 is configured such that either the first mode corresponding to the rotation range of the focus ring 203 or the second mode corresponding to the rotation speed of the focus ring 203 can be selected. According to this configuration, since the user can select the suitable control mode in accordance with an object, the usability can further be improved.

The imaging device 1 according to the embodiment includes the DRAM 208 storing the excess rotation amount of the focus ring 203 when the focus ring 203 is rotated in one direction beyond the rotation range set in the setting part 102. When the focus ring 203 is rotated in one direction beyond the rotation range set in the setting part 102, the lens controller 205 stops the drive of the lens drive part 204 until the focus ring 203 is rotated in the opposite direction by the excess rotation amount. According to this configuration, the deviation of the rotation position of the focusing ring 203 being in focus can be suppressed, and the imaging device can be bought into focus by rotating the focusing ring 203 in the opposite direction to the original position. Therefore, the usability can further be improved.

In the imaging device 1 according to the embodiment, the setting part 102 is configured such that whether to control the drive of the lens drive part 204 based on the excess rotation amount can be selected. According to this configuration, sine the user can select a suitable control in accordance with an object, the usability can further be improved.

In the above description, the setting part 102 is configured such that the rotation range of the focus ring 203 can be set within the range from the maximum rotation amount to the minimum rotation amount stored in the flash memory 207, however, the configuration of the imaging device 1 is not limited thereto. For example, the setting part 102 may be configured such that one rotation range can be selected from multiple rotation ranges set in advance as the rotation ranges of the focus ring 203 assignable to multiple positions within the movement stroke of the focus ring 203. For example, if the focus ring 203 normally has the maximum rotation amount of 150 degrees and the minimum rotation amount of 60 degrees, the setting part 102 may be configured such that one rotation range can be selected from multiple rotation ranges set in advance within the range of 60 degrees to 150 degrees. This configuration can eliminate the need to store the maximum rotation amount and the minimum rotation amount in the flash memory 207 of the interchangeable lens unit 200.

The liquid crystal monitor 108 may be configured to function as a display part displaying the multiple rotation ranges set in advance. According to this configuration, since the selectable rotation ranges can be confirmed with the liquid crystal monitor 108, the usability can further be improved.

In the above description, the lens controller 205 stops the drive of the lens drive part 204 until the focus ring 203 is rotated in the opposite direction by the excess rotation amount; however, the configuration of the imaging device 1 is not limited thereto. For example, the lens controller 205 may drive the lens drive part 204 when the focus ring 203 is rotated in one direction beyond the rotation range set in the setting part 102 and is further rotated in one direction by a rotation amount obtained by subtracting the rotation range and the excess rotation amount from an integral multiple of 360 degrees. For example, when the operation lever 209 is further rotated in one direction from the position shown in FIG. 11C and reaches the lower limit of the rotation range, the control based on the excess rotation amount may be reset, and the lens drive part 204 may be driven. According to this configuration, for example, when the excess rotation amount is 360 degrees, this configuration can eliminate the need to rotate the focus ring 203 in the opposite direction by 360 degrees and can further reduce the rotation amount of the focus ring 203 for focusing. Therefore, the usability can further be improved.

In the above description, the interchangeable lens unit 200 includes the lens drive part, the storage part, the rotation amount storage part, the excess rotation amount storage part, and the control part, and the camera body 100 includes the setting part and the display part; however, the present disclosure is not limited thereto. For example, the lens drive part, the storage part, the rotation amount storage part, the excess rotation amount storage part, the control part, the setting part, and the display part may be included in either the camera body 100 or the interchangeable lens unit 200. When the camera body 100 includes at least the setting part, various settings can be performed with the camera body 100, so that the usability can further be improved.

In the above description, the CMOS image sensor 104 is used as an example of the imaging element; however, the configuration of the imaging device 1 is not limited thereto. For example, a CCD image sensor or an NMOS image sensor may be used as an imaging element.

Figure 12:
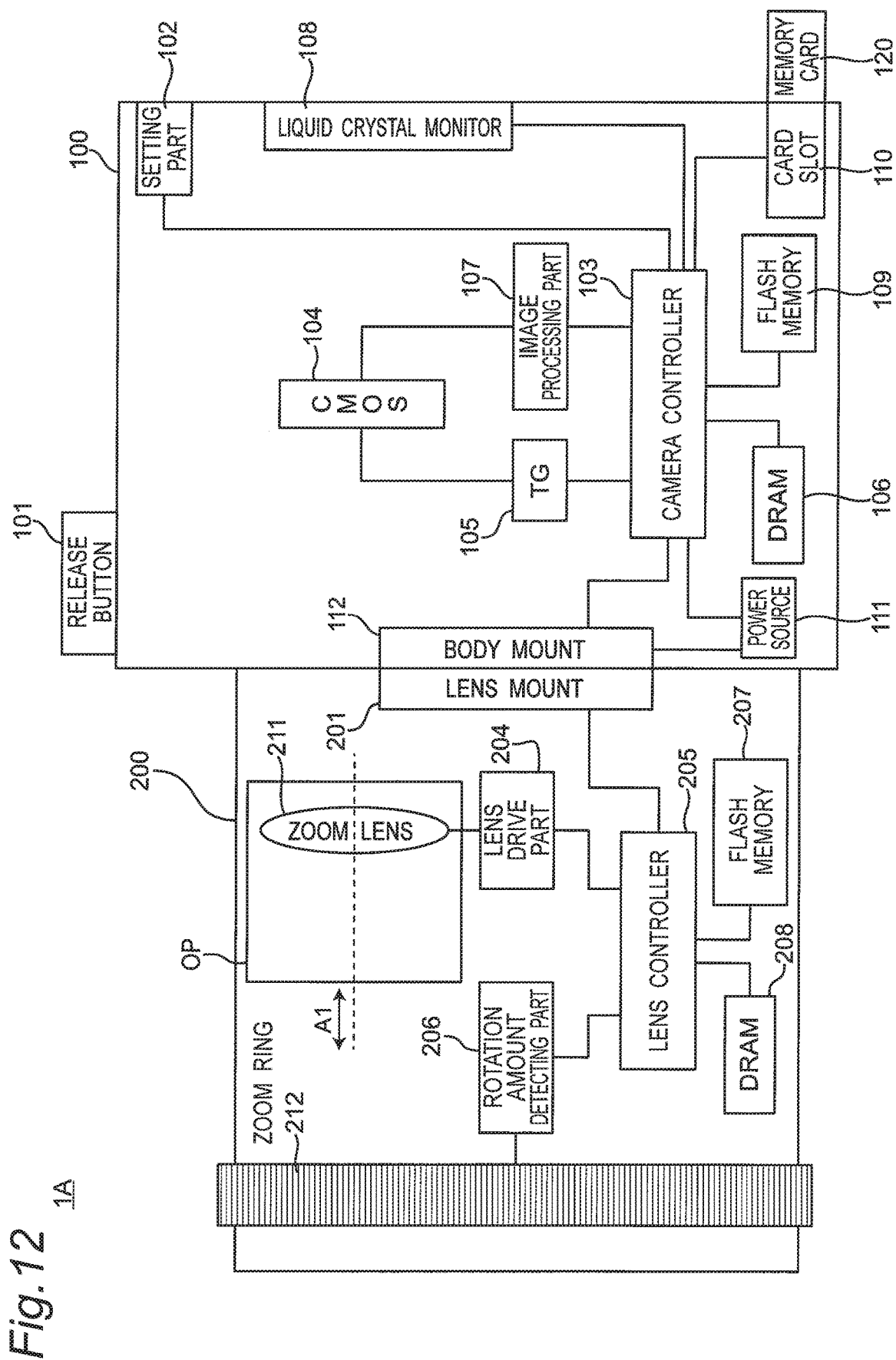
FIG. 12 is a block diagram showing a schematic configuration of an imaging device according to a modification having a motorized zoom function.

In the configuration example described above, the focus lens 202 is moved in the optical axis direction A1 depending on the rotation amount of the focus ring 203; however, the configuration can be applied to a configuration of an imaging device having a motorized zoom function. FIG. 12 is a block diagram showing a schematic configuration of an imaging device 1A according to a modification having a motorized zoom function.

As shown in FIG. 12, the imaging device 1A according to the modification includes a zoom lens 211 that is an example of a lens, and a zoom ring 212 that is an example of an operation ring, instead of the focus lens 202 and the focus ring 203.

The zoom lens 211 is a lens moving forward and backward in the optical axis direction A1 of the optical system OP to change a magnification of an object image formed by the optical system OP. The zoom lens 211 is made up of one or more lenses.

The zoom ring 212 is an infinite rotation type ring-shaped member having no mechanical restriction on a rotation range. The zoom ring 212 is rotatably disposed on the cylindrical exterior member of the interchangeable lens unit 200 such that a rotation axis is positioned parallel to the optical axis direction A1 of the optical system OP.

The lens drive part 204 moves the zoom ring 212 forward and backward in the optical axis direction A1 of the optical system OP. As the zoom lens 211 moves forward and backward in the optical axis direction A1, the magnification of the object image formed by the optical system OP changes. In the embodiment, the lens drive part 204 moves the zoom lens 211 forward and backward from a tele end that is an example of the first position to a wide end that is an example of the second position. The "tele end" is a position at which the focal length of the zoom lens 211 is made longest. The "wide end" is a position at which the focal length of the zoom lens 211 is made shortest. The "tele end" and the "wide end" are also referred to as "drive ends".

The lens controller 205 controls the drive of the lens drive part 204 to move the zoom lens 211 depending on a rotation amount (e.g., a rotation angle) of the zoom ring 212. The lens controller 205 controls the drive of the lens drive part 204 based on the information stored in the flash memory 207 and the DRAM 208 depending on the rotation amount of the zoom ring 212 detected by the rotation amount detecting part 206. The DRAM 208 functions as a storage part assigning and storing respective different rotation amounts of the zoom ring 212 to multiple positions within the movement stroke of the focus lens 202 in accordance with the rotation range set in the setting part 102.

The rotation amount detecting part 206 detects the rotation amount of the zoom ring 212. The lens data stored in the flash memory 207 includes information of the maximum rotation amount and the minimum rotation amount of the zoom ring 212 assignable to multiple positions within the movement stroke from the tele end to the wide end of the zoom lens 211.

The setting part 102 drives the lens drive part 204 to move the zoom lens 211 depending on the rotation amount of the zoom ring 212 to a position corresponding to the rotation amount stored in the flash memory 207.

In the imaging device 1A according to the modification, respective different rotation amounts of the zoom ring 212 are assigned to multiple positions within the movement stroke of the zoom lens 211 in accordance with the rotation range set in the setting part 102 and are stored in the DRAM 208. The lens controller 205 is configured to drive the lens drive part 204 to move the zoom lens 211 depending on the rotation amount of the zoom ring 212 to a position corresponding to the rotation amount stored in the DRAM 208. According to this configuration, since the user can set the rotation range of the zoom ring 212 with the setting part 102 in accordance with an object, the usability can further be improved.

The embodiments have been described as exemplifications of the techniques in this disclosure. The accompanying drawings and the detailed description have been provided for this purpose. Therefore, the constituent elements described in the accompanying drawings and the detailed description may include not only the constituent elements essential for solving the problem but also constituent elements not essential for solving the problem so as to exemplarily describing the techniques. Therefore, even though these non-essential constituent elements are included in the accompanying drawings and the detailed description, these non-essential constituent elements should not immediately be recognized as being essential.

Since the embodiments described above are intended to exemplarily describe the techniques of this disclosure, various modifications, replacements, additions, and omissions can be made within the claims and the scope equivalent thereto.

EXPLANATIONS OF LETTERS OR NUMERALS 1, 1A imaging device
100 camera body
101 release button
102 setting part
103 camera controller
104 CMOS image sensor
105 timing generator
106 DRAM
107 image processing part
108 liquid crystal monitor
109 flash memory
110 card slot
111 power source
112 body mount
120 memory card
200 interchangeable lens unit
201 lens mount
202 focus lens
203 focus ring
204 lens drive part
205 lens controller
206 rotation amount detecting part
207 flash memory
208 DRAM
209 operation lever
211 zoom lens
212 zoom ring
261 rotating body
261a slit
262 light emitting part
263 light receiving part
OP optical system
A1 optical axis direction

The invention claimed is:

1. An imaging device including a camera body and an interchangeable lens unit detachably attached to the camera body, the imaging device comprising:
   an optical system including a focus lens;
   an infinite rotation type focus ring;
   a lens drive part moving the focus lens forward and backward in an optical axis direction of the optical system;
   a setting part allowing a user to set a rotation range of the focus ring;
   a storage part assigning and storing respective different rotation amounts of the focus ring to multiple positions within a movement stroke of the focus lens in accordance with a rotation range set in the setting part, the multiple positions including a first position and a second position of the focus lens along the optical axis direction;
   a control part driving the lens drive part to move the focus lens depending on a rotation amount of the focus ring to a position corresponding to the rotation amount stored in the storage part; and
   a rotation amount storage part storing information of a maximum rotation amount and a minimum rotation amount of the focus ring assignable to multiple positions within the movement stroke, the maximum rotation amount representing a maximum rotation range of the focus ring assignable to move the focus lens between the first position and the second position along the optical axis direction, and the minimum rotation amount representing a minimum rotation range of the focus ring assignable to move the focus lens between the first position and the second position along the optical axis direction, and wherein
   the setting part is configured to enable setting of the rotation range of the focus ring to rotation range amounts corresponding to an angle selected by the user within a range from the maximum rotation amount to the minimum rotation amount stored in the rotation amount storage part when the interchangeable lens unit is attached to the camera body while displaying a numerical value of the angle selected by the user corresponding to rotation amount between the maximum rotation amount and the minimum rotation amount on a screen, in order to allow the user to adjust a rotation amount of the focus ring necessary to move the focus lens between the first position and the second position along the optical axis direction between the maximum rotation amount and the minimum rotation amount.

2. The imaging device according to claim 1, wherein the setting part is configured to enable selection of one rotation range from a plurality of rotation ranges preset as rotation ranges of the focus ring assignable to multiple positions within the movement stroke.

3. The imaging device according to claim 2, further comprising a display part displaying the plurality of preset rotation ranges.

4. The imaging device according to claim 1, further comprising a display part displaying multiple rotation amounts within the range from the maximum rotation amount to the minimum rotation amount stored in the rotation amount storage part, wherein the setting part is configured to enable selection of any one of the multiple rotation amounts displayed on the display part as the rotation range of the focus ring.

5. The imaging device according to claim 1, wherein the setting part is configured to enable selection of either a first mode in which the focus lens is moved depending on a rotation range of the focus ring or a second mode in which the focus lens is moved depending on a rotation speed of the focus ring.

6. A camera body used in the imaging device according to claim 1, the camera body comprising: at least the setting part.

* * * * *